United States Patent [19]
LeBlanc

[11] Patent Number: 5,852,240
[45] Date of Patent: Dec. 22, 1998

[54] PORTABLE FLOW MEASURING DEVICE

[76] Inventor: David P. LeBlanc, 7 Barbara Ct., Long Beach, Miss. 39560

[21] Appl. No.: 456,828

[22] Filed: Jun. 1, 1995

[51] Int. Cl.$^6$ ....................................................... G01F 1/20
[52] U.S. Cl. ................................................. 73/215; 73/216
[58] Field of Search .............................. 73/215, 216, 861, 73/861.65, 861.63

[56] References Cited

U.S. PATENT DOCUMENTS

| | | | |
|---|---|---|---|
| 1,256,867 | 2/1918 | Bender | 73/216 |
| 2,817,237 | 12/1957 | Stevens | 73/705 |
| 3,681,988 | 8/1972 | McNulty | 73/215 |
| 3,965,740 | 6/1976 | Martig, Jr. | 73/215 |
| 4,034,607 | 7/1977 | Martig, Jr. | 73/215 |
| 4,367,652 | 1/1983 | Venuso | 73/861 |
| 4,571,997 | 2/1986 | Kepple et al. | 73/215 |
| 5,423,226 | 6/1995 | Hunter et al. | 73/215 |

*Primary Examiner*—Richard Chilcot
*Assistant Examiner*—Max H. Noori

[57] ABSTRACT

A portable secondary flow measuring device (10) with various attachments and adapters for use in several types of open channel flow installations including flumes, weir plates and gravity flow pipelines. A manometer type flow indicating apparatus (40), an integral flow sensing probe (30) and a separate portable air supply (20) are three basic components of the device.

1 Claim, 4 Drawing Sheets

5,852,240

PORTABLE FLOW MEASURING DEVICE

BACKGROUND OF THE INVENTION

1. Field of the Invention

The present invention relates generally to a portable handheld flow meter involving no mechanical or electrical components other than a separate means to power a portable air supply. The invention is more specifically a portable secondary flow measuring device used to measure fluid flow rates in open channels with permanent primary flow measuring devices such as flumes and weir plates. The invention also measures flow rates in gravity flow pipes with a portable weir channel type primary flow measuring device. Accurate flow measurements based on known empirical formulas are obtained with the device.

2. Prior Art

There have been different techniques for monitoring fluid flows in open channels. For example, reference may be made to the following U.S. Pat. Nos. 1,258,867; 2,817,237; 4,034,607; 4,367,652; and 4,571,997. It is apparent from the foregoing patents that it is important to measure flows through gravity flow piping such as stormwater drains and wastewater collection systems. However, it is equally important to measure flows through other open channel installations with flumes or weir plates. Measurement of these flows is critical for flow studies, process operations, billing purposes and governmental compliance requirements. These flows are normally measured with permanent electronic or mechanical type flow metering devices. Electronic displays on these permanently installed devices present a unique challenge for the operator to verify the output accuracy of the reading when the method of calibration requires a no-flow condition in the flow stream. This is almost always impossible to obtain under actual field conditions. Also, portable flow measuring devices are often used to verify the accuracy of permanent flow measuring devices. Some portable devices have been known to provide instantaneous flow readings only after steady state conditions are achieved. However, in most open channel flow installations, steady state conditions are never achieved since flow levels fluctuate continuously. Other portable devices have not provided a means for simple field calibration of the device to verify its accuracy prior to use. Previous portable devices have also been limited by their range of accuracy because of their inability to meet known design requirements. Other portable devices are also limited in their usefulness to measure flows in only one type of open channel flow installation. A portable flow measuring device that can be used to accurately verify flow measurement outputs from other devices, is easily calibrated in the field prior to its use, measures open channel flows in accordance with known design requirements, provides continuous flow readings during operation and is easily adaptable to measuring flows in various open channel flow installaions and under varying field conditions has not been available until now.

SUMMARY OF THE INVENTION

The present invention is a portable flow measuring device that measures fluid flow rates in open channels. It operates with no mechanical or electrical components other than a separate means to power the portable air supply. Three (3) basic components comprise the secondary flow measuring device: 1) A manometer type flow indicating apparatus 2) An integral flow sensing probe adaptable to varying field conditions and 3) A separate portable air supply. Three (3) separate attachments allow for measuring flows in a weir channel, in a flume and through open pipes inside manholes or catch basins.

The manometer type flow indicating apparatus is a flow measuring device that operates on the principal of differential pressure. As the probe is submerged within the fluid flow, backpressure is exerted on the supplied air thereby creating a manometer fluid elevation difference in direct proportion to the level of water above the bottom of the flow probe. The level of the manometer fluid is read directly on the graduated flow scale as seen through the clear plastic piping comprising the manometer type flow indicating apparatus. This manometer fluid level is then converted into a known flow rate through a primary flow measuring device by use of charts, scales, gauges or other indicating means. Since the supplied air serves as the flow measuring medium between the fluid flow and the manometer fluid, the two fluids are never in direct contact and the manometer fluid cannot become contaminated. The length of the probe can be varied as long as sufficient air is provided to produce adequate backpressure within the flow probe. The flow probe consists of sections of nominal diameter plastic piping cut to the required length to suit field conditions and re-attached to the manometer type flow indicating apparatus of the present invention. A constant air supply allows for continuous flow measurements in order to visualize a constantly changing flow rate. The height of water above the zero elevation point of a primary flow measuring device such as the bottom of a flume or the crest of a weir plate is read directly on the graduated flow scale and converted to a known flow rate.

OBJECTS OF THE INVENTION

One of the objects of the present invention is to measure open channel flow rates through primary flow measuring devices such as flumes and weirs.

Another object of the present invention is to provide a nonmechanical or electrical means for verifying the accuracy of existing mechanical and electrical type secondary flow meter installations.

Another object of the present invention is to provide a durable, noncorrosive, portable and lightweight device that is easily assembled and modified to suit varying field conditions.

Another object of the present invention is to allow the user to visualize the actual flow levels through a primary flow measuring device at eye level, thus avoiding parallax conditions, by making the flow probe length easily adaptable to varying field conditions through the use of nominal diameter plastic pipe and fittings.

Another object of the present invention is to provide a flow measuring device that provides continuous flow readings by use of a portable constant air supply thereby not requiring stabilized flow conditions to accurately measure flows. In reality, flow rates in open channels are constantly changing and are rarely stabilized.

Another object of the present invention is to provide a flow measuring device that is easily calibrated in the field prior to each use.

Another object of the present invention is to provide water as the manometer fluid thus allowing for better accuracy because of a direct relationship between the specific gravity of the manometer fluid and the fluid being measured and also allowing for easy replacement of the manometer fluid in the field during and after each use.

Another object of the present invention is to provide attachments for the portable secondary flow measuring device that allow for proper location of the flow sensing probe within the primary flow measuring device in accordance with known design requirements for accurate flow readings.

Another object of the present invention is to provide a means for accurately measuring flows through an open channel pipe with a portable device that incorporates known design requirements for a weir plate type primary flow measuring device and also allows for low and high flow conditions by incorporation of a combined weir.

Another object of the present invention is to provide a portable primary flow measuring device that can be used in conjunction with a portable secondary flow measuring device in which the primary flow measuring device utilizes adapters for installation in various diameter pipe inlets thereby requiring no modifications to the primary flow measuring device.

Another object of the present invention is to provide a means for measuring flows in a confined space, such as a manhole or catch basin, without requiring entry into the confined space by the user.

Other features and advantages of the present invention will become apparent from the following detailed description when read with the accompanying drawings.

DESCRIPTION OF THE PREFERRED EMBODIMENT

Figure 1:
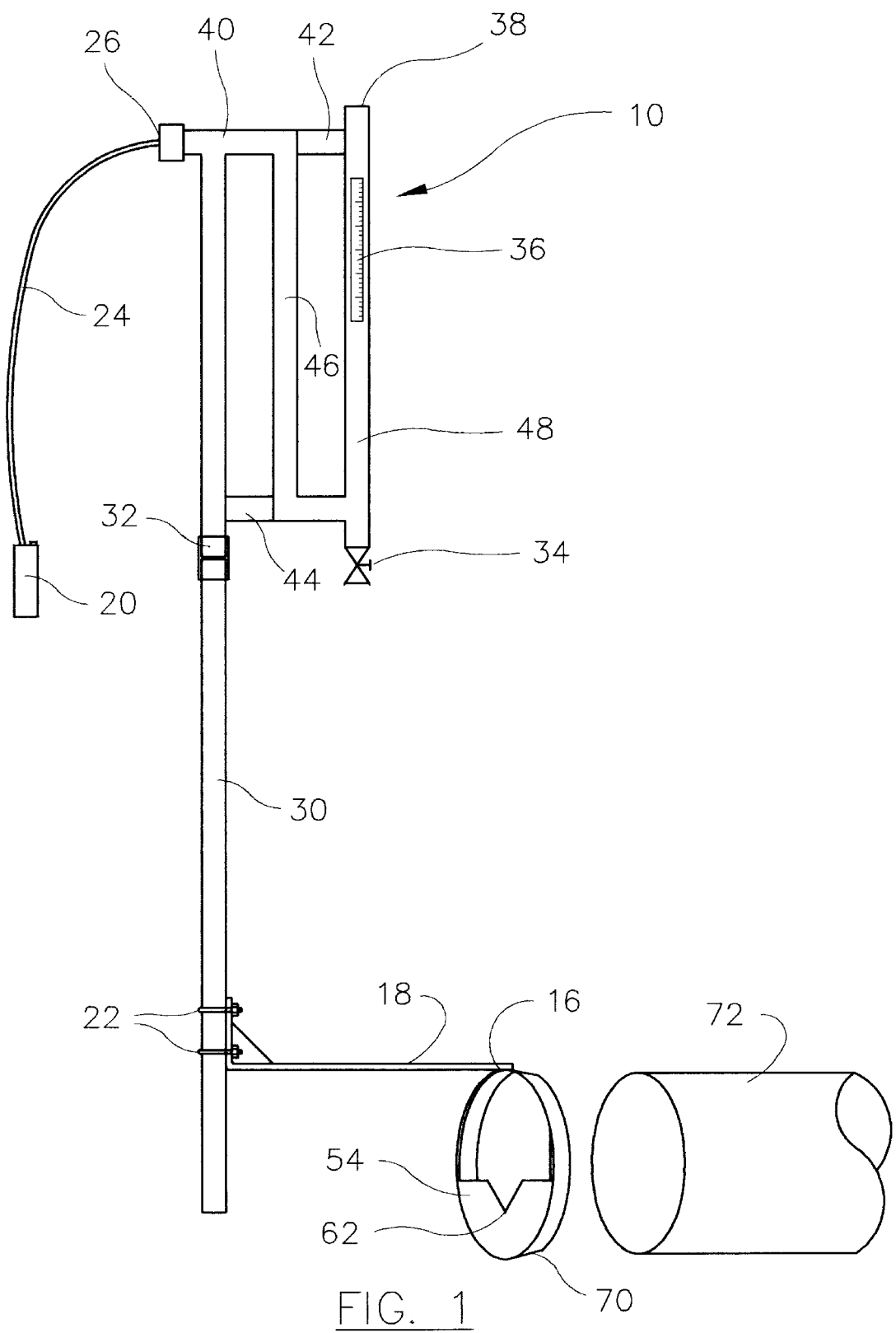
FIG.1 is an elevation view of the portable secondary flow measuring device being used with the weir plate attachment and probe holder to measure flows over a weir plate.

FIG. 1 of the drawings illustrates a portable secondary flow measuring device 10 used for measuring fluid flow rates in open channels. Flow measuring device 10 includes a flow sensing probe 30 attached to a manometer type flow indicating apparatus 40 by means of a standard nominal diameter fitting 32. A separate portable air supply 20 connects to manometer apparatus 40 by a detachable plastic supply tube 24 attached to a tube fitting 26. Air supply 20 is powered by a battery or similar means. All components of manometer apparatus 40 are nominal diameter clear plastic piping connected with standard plastic pipe fittings or a similar type piping system. The clear plastic piping is lightweight. The clear piping also allows the user to visualize the manometer fluid level directly as it correlates with the rise and fall of the actual fluid level being measured by flow probe 30. Solid sleeves 42 and 44 are installed within manometer apparatus 40 at the locations shown in FIG. 1 in order to create the U-tube manometer shape required for operation. An open end 38, exposed to the atmosphere, is located at the top of an ascending fluid level column 48 of manometer apparatus 40. Open end 38 equalizes the air pressure and resultant fluid level within manometer apparatus 40.

Water is used as the measuring fluid in manometer apparatus 40. Water has the same or nearly the same specific gravity as the fluid being measured. Therefore, a direct relationship exists between the level of fluid being measured and the resultant fluid level in manometer apparatus 40. The water rises in column 48 and falls in a descending fluid level column 46 when backpressure is exerted on the air medium within manometer apparatus 40.

A throttling type valve 34 is attached directly below column 48 of manometer apparatus 40. A graduated flow scale 36 is attached to column 48 of manometer apparatus 40. Flow scale 36 is graduated at half scale increments thus enabling the user to read direct fluid levels when measuring flow rates. A fluid level rise in column 48 is half of a corresponding fluid level fall in descending column 46 of manometer apparatus 40. The elevation difference between these two fluid levels is equal to the fluid level above the bottom of flow probe 30 and is read directly on flow scale 36.

Flow probe 30 is constructed of nominal diameter plastic pipe and fittings or a similar type material. Thus, modifications of flow probe 30 to suit varying field conditions is possible. Flow probe 30 is easily cut and standard fittings used for reattachment or additional length is obtained with standard pipe and fittings. As a result, the user always reads flow scale 36 at eye level. Reading flow measurements at eye level is critical for eliminating parallax conditions which cause inaccurate flow readings.

Figure 2:
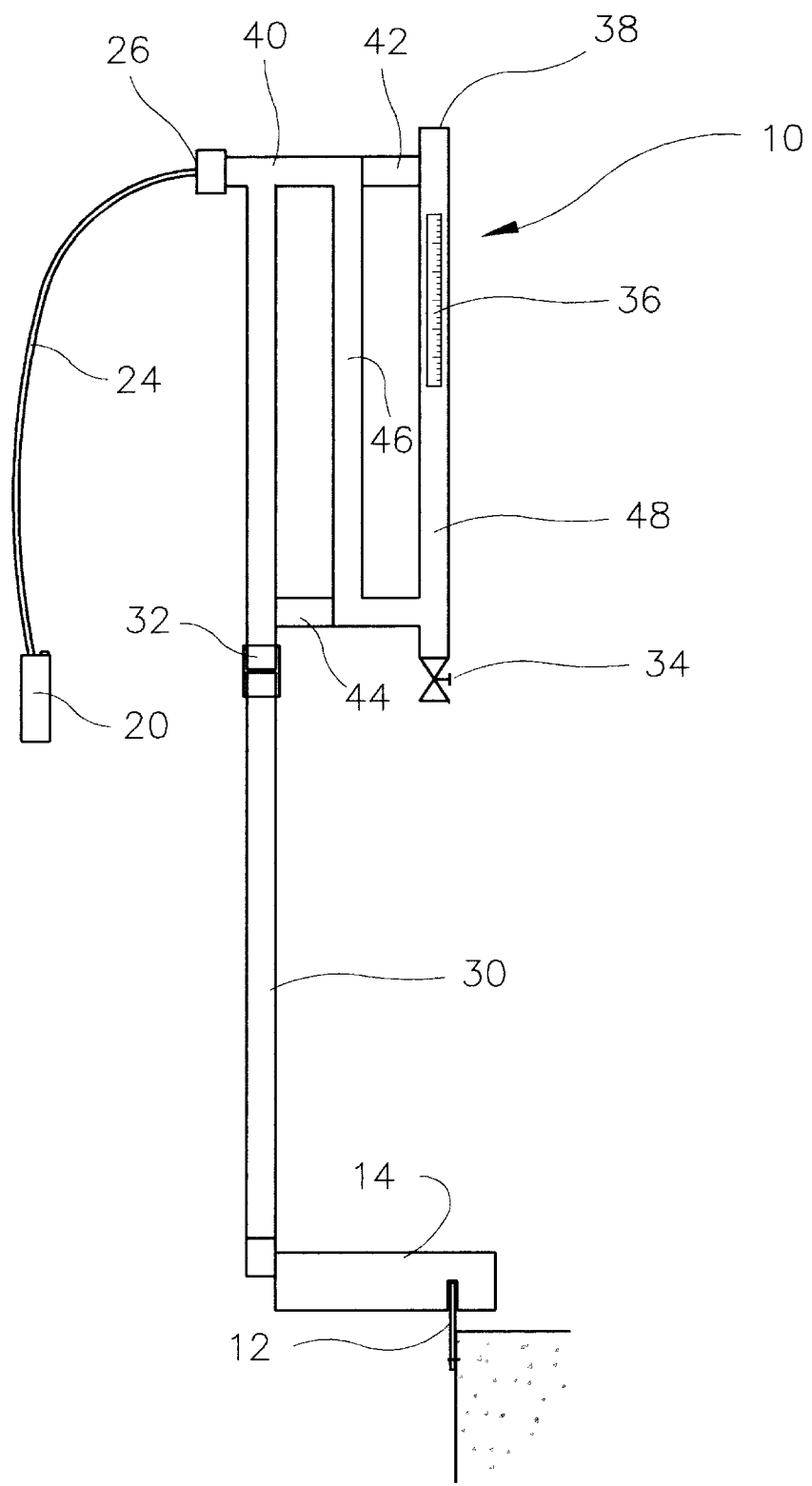
FIG.2 is an elevation view of the weir plate attachment and probe holder.

When used to measure open channel flows over primary device 12, flow measuring device 10 is used in conjunction with a probe holder device 14 as shown in FIG. 2.

Figure 3:
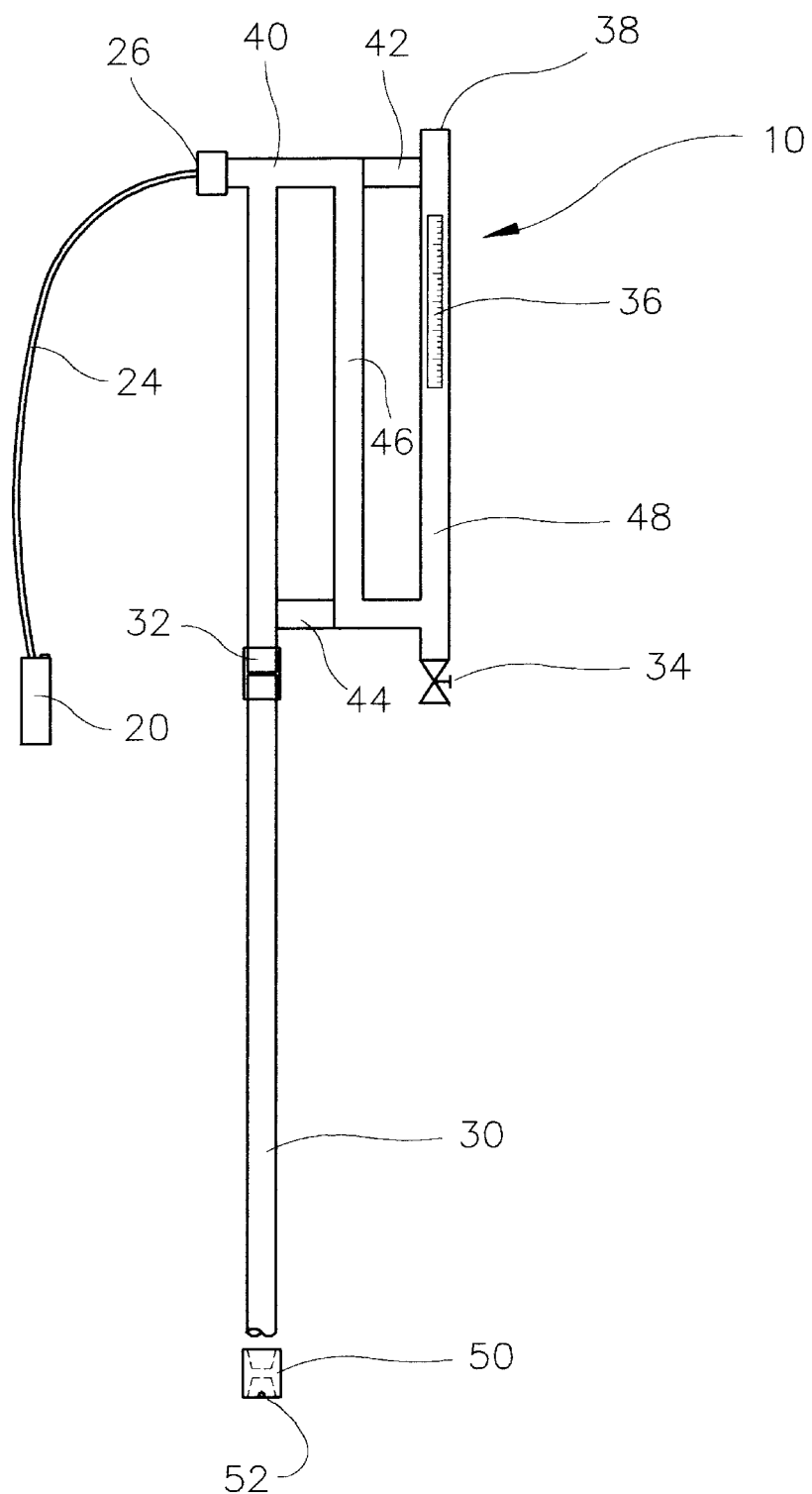
FIG.3 is a plan view cross section of the weir plate attachment taken along lines 3—3 of FIG. 2.

When used to measure open channel flows in a flume, flow measuring device 10 is used in conjunction with a flume attachment device 50 as shown in FIG. 3. Flume device 50 is a nominal diameter plastic or similar material pipe fitting with a small side outlet orifice 52 located near a lower end. Flume device 50 is attached to a lower end of flow probe 30. Flow probe 30 is then placed on a bottom elevation of a flume and at a proper location to measure flow rates. Orifice 52 allows for a fluid level backpressure on the air supply medium in flow probe 30 at an approximate zero level of a flume.

When used to measure open channel flows in a gravity flow pipe 72, flow measuring device 10 is used in conjunction with attachment device 18 and a portable weir apparatus 54 as shown in FIG. 1. Weir apparatus 54 is constructed of lightweight plastic, fiberglass or similar material. Dimensions of weir apparatus 54 conform to design requirements for a rectangular weir in combination with a 90 degree V-notch weir.

As shown in FIG. 1, flow probe 30 is connected to attachment device 18 by probe attachment 22. The bottom of flow probe 30 is located at a required distance upstream of weir plate 54 and at the same elevation as an apex 62 on weir plate 54.

A conical shaped adapter 70 attaches to weir apparatus 54. Adapter 70 is made of ruber of a similar flexible type material.

Figure 4:
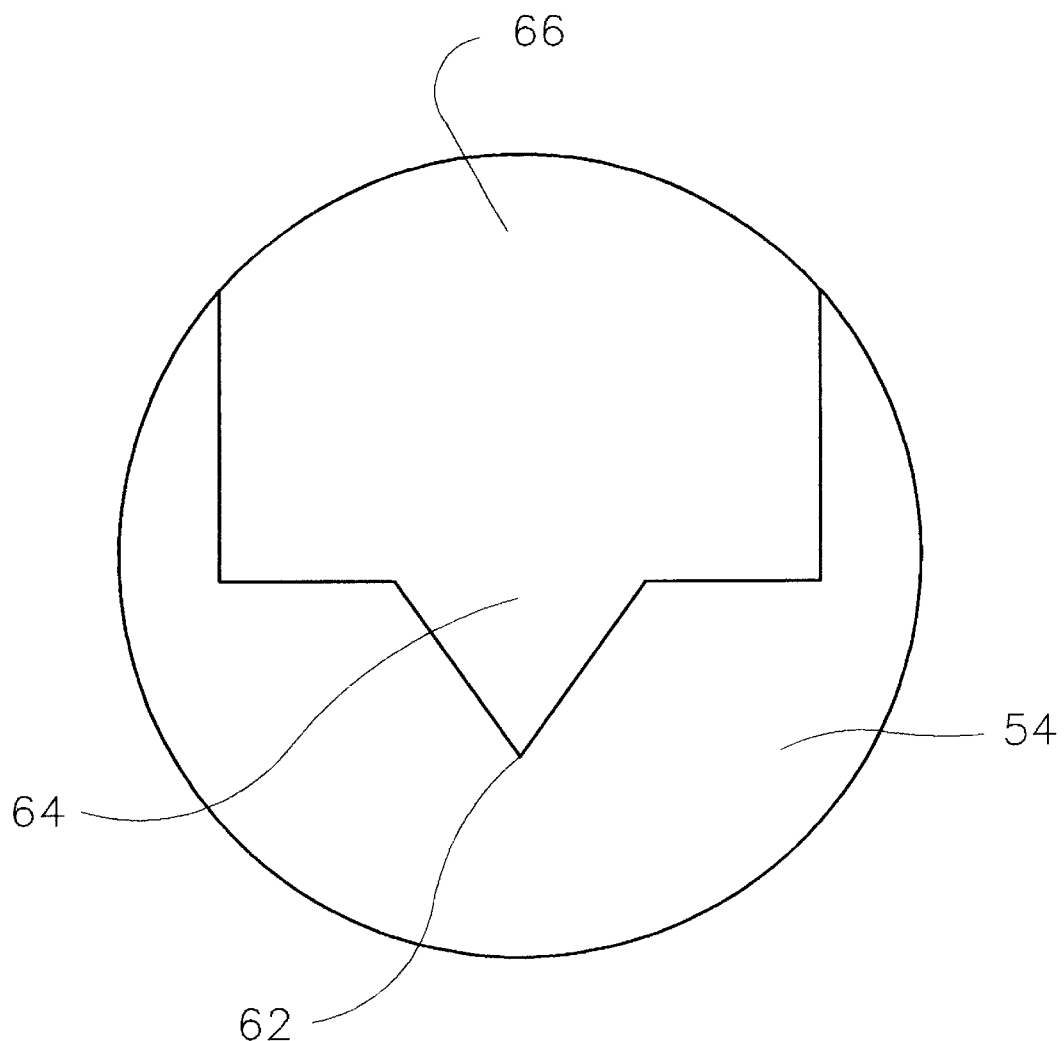
FIG.4 is an elevation view of the flume attachment.

Adapter 70 is temporarily inserted into pipe 72 when used to measure open channel flows in a gravity flow pipe. The horizontal fluid velocity forces adapter 70 into inlet pipe 72 and forms a temporary seal. During low flow conditions, fluid flows through a 90 degree V-notch section 64 of weir apparatus 54. During high flow conditions, fluid flows above section 64 and through a rectangular weir plate section 66 as shown in FIG. 4. Weir apparatus 54 then functions as a rectangular weir with end contractions. The flow rate or height of fluid above apex 62 is read directly on flow scale 36 attached to manometer apparatus 40. The total flow rate over weir plate 54 is equal to the flow rate through section 64 plus the flow rate through section 66. This flow rate is determined by known equations relating the height of fluid above apex 62 to a known flow rate.

OPERATION

To operate flow measuring device 10, reference is made to FIG. 1. Manometer apparatus 40 is filled with measuring fluid to the zero level or above on flow scale 36. Measuring fluid is introduced through open end 38 on column 48 of manometer apparatus 40. Valve 34 is used to release excess measuring fluid until a zero starting level is obtained. Manometer apparatus 40 is then connected to the proper length of flow probe 30 by means of a standard nominal diameter fitting 32. Air supply 20 is attached to fitting 26 using air tubing 24.

Before commencing operation, flow measuring device 10 is calibrated by lowering flow probe 30 a known depth into a container of water. Air supply 20 is activated. The level reading on flow scale 36 is then verified by the depth of water above the bottom of flow probe 30. Fine tune calibration is then accomplished by using valve 34 to adjust the fluid level in manometer apparatus 40 accordingly.

After successful calibration, flow probe 30 is connected to weir apparatus 54 and placed into a pipe opening. Air supply 20 is activated to create a backpressure medium for the fluid level being measured. This medium also prevents the fluid flow from contacting and contaminating the measuring fluid in manometer apparatus 40. As the fluid level rises above the bottom of flow probe 30, backpressure is exerted on the air inside flow probe 30. This backpressure forces the fluid level inside manometer apparatus 40 to rise in column 48 and fall in column 46. The total difference between the fluid levels in these two columns is equal to the fluid level rise above the bottom of flow probe 30. Continuous level readings or flow rates are then read directly on flow scale 36 in correlation to the height of water above apex 62. Standard tables based on known empirical formulas are used to convert level readings to known flow rates.

While the foregoing description of the preferred embodiment of the invention has been presented for the purposes of illustration and description, it is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A portable secondary flow measuring device for integral use with a primary flow measuring device to be temporarily installed outside of an open channel fluid flow configuration, comprising:

(a) a manometer type flow indicating apparatus, a portable air supply means, and (b) a substantially cylindrical flow sensing probe attached to one end of said manometer type flow indicating apparatus, and (c) a right angular support frame attached to one end of said flow sensing probe, and (d) a substantially circular device located at one end of said support frame, and (e) a weir shaped opening of predetermined dimensions within said circular device, and (f) an attachment means on one side of said circular device used in conjunction therewith for positioning said weir opening outside of a circular conduit.

* * * * *